INVENTORS
HARRY WILLIAM HOFFMAN
GROVER H. HELMER
By Paul, Paul & Moore
ATTORNEYS

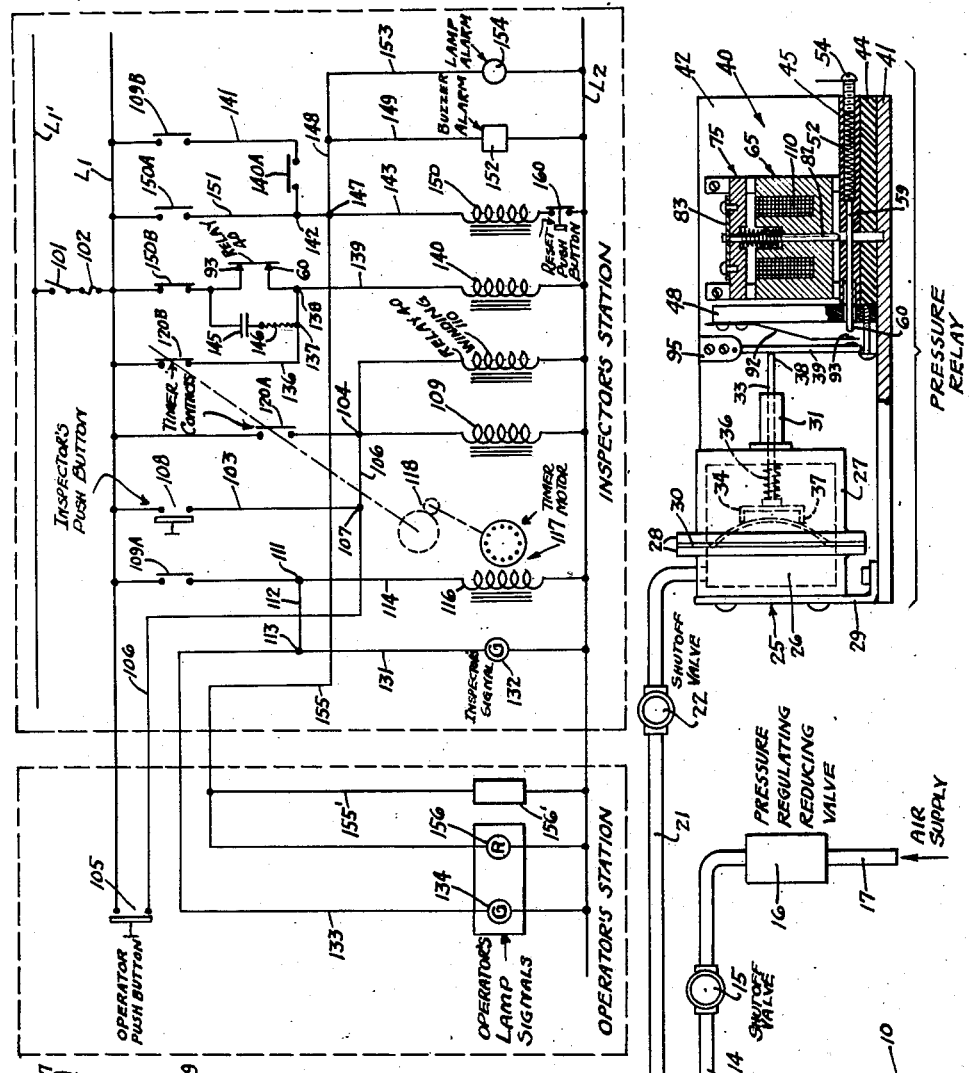

Patented June 14, 1949

2,472,973

UNITED STATES PATENT OFFICE

2,472,973

PRESSURE TESTING APPARATUS AND CONTROL CIRCUITS THEREFOR

Harry William Hoffman, Anoka, and Grover H. Helmer, Minneapolis, Minn., assignors to Federal Cartridge Corporation, Minneapolis, Minn., a corporation of Minnesota Application January 20, 1944, Serial No. 518,962

12 Claims. (Cl. 73—40)

This invention relates to apparatus for testing by the application of pressure to any desired value wherein a change, particularly a decrease of the pressure during the testing period is indicative of the holding capacity of the device under test. The invention has specific application in the testing of tanks or vessels with fluid pressure wherein pressure is applied and then the application of pressure discontinued, and the decrease of pressure during the testing period, if any, utilized for the indication of failure or other work operation, such as discarding the unit under test.

It is an object of the invention to provide an apparatus and system for testing apparatus by applied pressure or potential and more particularly to provide a pressure testing apparatus for testing vessels or tanks for leakage under sustained pressure. It is also an object of the invention to provide an apparatus capable of being utilized with variable pressures or potentials, and yet capable of accurately indicating any decrease or change in pressure or potential applied to the vessel or apparatus undergoing testing.

It is a further object of the invention to provide a testing apparatus wherein testing is initiated by an operator, but is terminated, in case of failure, at another station, as by an inspector.

It is also an object of the invention to provide a sensitive fluid pressure testing apparatus capable of being utilized in connection with systems wherein the testing pressure is variable.

Other and further objects of the invention are those inherent in the apparatus illustrated, described and claimed.

The invention is illustrated by the drawings wherein

Figure 1 is a wiring diagram of the testing apparatus;

Figure 2 is a schematic diagram showing a portion of the physical testing apparatus, certain portions of the testing apparatus being shown in section;

Figure 3:
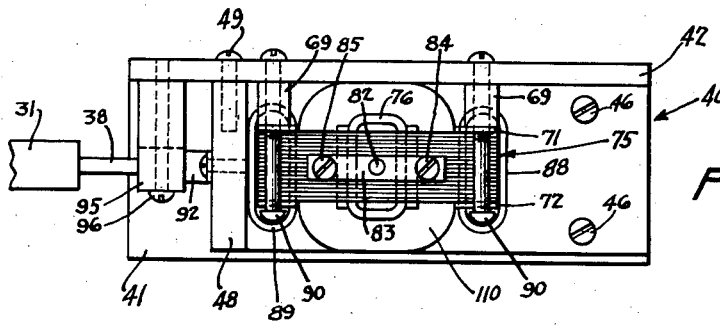
Figures 3, 4 and 5 are respectively top, side elevational and end elevational views of an element of the testing apparatus, a part of Figure 4 being shown in section, the remainder in elevation.

Figures 6 and 7 are respectively end and side elevational views of another portion of the testing apparatus; and Figure 8 is a sectional view of the apparatus shown in Figures 6 and 7 taken in the direction of arrows 8—8 of Figure 7.

Throughout the drawings corresponding numerals refer to the same parts.

Referring to the drawings, Figure 2 schematically illustrates the invention as applied to the testing of vessels or tanks for leakage under applied fluid pressure. In Figure 2 the vessel undergoing test is illustrated at 10 and is provided with a nipple 11 which is coupled by means of the easily removable union 12, or other coupling, to nipple 13 of air pressure supply line 14. The air pressure supply line is provided with a shut-off valve 15 and a pressure regulating and reducing valve 16 of usual design. Air pressure is supplied by means of pipe 17 from any convenient source. It is the purpose of the pressure-regulating valve 16 to supply from line 17 a uniform or nearly uniform pressure on line 14, but due to the irregularities in the operation of the reducing and regulating valve 16, the pressure on line 14 may vary within commercially available limits. To line 14 there is also coupled a T 19 having air pressure gauge 20 mounted thereon. To the T there is also connected line 21 which is equipped with shut-off valve 22.

Line 21 extends to a pressure responsive apparatus generally designated 25, comprising complementary flanged containers 26 and 27 which are fastened at the flanges 28 by screws or other suitable fastening devices. The member 26 is mounted by means of bracket 29 in any suitable manner. Between the flanges 28 there is fastened a rubber diaphragm 30 which is normally situated in a flat plane directly in a line with the flange 28. The container 27 is provided with an axial collar 31 which is drilled to receive a stem 33 upon which there is mounted a cup 34 of considerably smaller diameter than the interior of the container 27. A light spring may be provided at 36, if desired, to maintain the flange 37 of the cup in contact with the rubber diaphragm 30. The outer end 38 of the stem 33 is arranged to abut against the swinging arm 39 of a pressure relay mechanism generally designated 40, illustrated in Figure 2 and also in Figures 3, 4 and 5.

Figure 4:
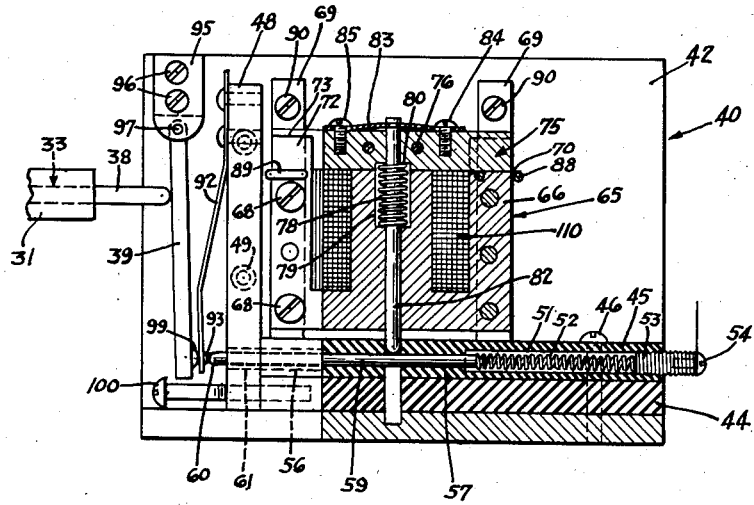
Figure 5:
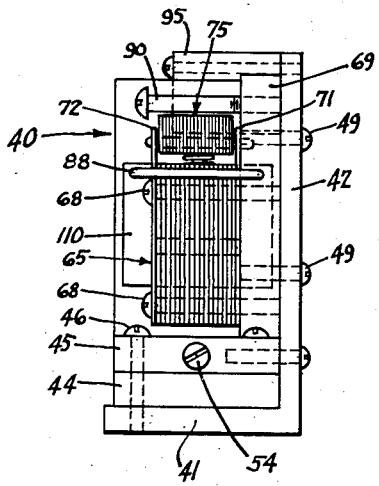

The relay mechanism 40 includes an angle-iron support having a base 41 and a back 42 which may conveniently also support the pressure device 25, although a separate base may be used if desired. Upon the base there are mounted a pair of superimposed insulating blocks 44 and 45 which are fastened to the base by means of screws 46. At the left end of the insulating blocks 44 and 45, shown in Figure 4, there is mounted a vertical block of insulating material 48 which is fastened to the back of the instrument by means of screws 49. The insulating block 45 is drilled at 51 to receive a spring 52 which is held in place by means of a screw plug 53 having a terminal 54 thereon. At the opposite end the block 45 is drilled out to the depth shown at 56, the intermediate portion between holes 56 and 51 being drilled in a smaller diameter, as illustrated at 57, to receive a rod 59 of conducting material which is preferably tipped at 60 with a contact material such as silver or platinum-iridium alloy. The end insulating block 48 is likewise drilled out at 61 in line with the hole 56 in the block 45 so as to allow free passage of the rod 59 therethrough. Spring 52 normally urges the rod 59 to the left, as shown in Figures 2 and 4.

Resting upon the insulating block 45 there is mounted a core and winding assembly generally designated 65. The portion 66 of the core is E-shaped and is stationary, being solidly fastened to the back 42 of the framework by means of a plurality of screws 68 which pass through the spacing block 69 so as to maintain the core at an appropriate distance from the back 42 to allow space for the winding. The stationary E-shaped portion of the core is terminated in a horizontal upper surface 70, except for the preferably thick front and back laminations 71 and 72 which extend upwardly to the level 73, as illustrated in Figure 4 so as to form a guide for the movable armature generally designated 75.

The armature 75 is likewise made up of a plurality of laminations held together by means of rivets or other fastenings. The armature 75 is normally maintained out of contact with the stationary core by means of a spring 78 which rests in a hole 79 in the E-shaped core 65 and extends upwardly into a corresponding countersunk hole 80 in the under side of the movable armature. The armature 75 and also the middle leg of the stationary E-shaped core 65 are drilled to receive the vertically movable locking rod 82 which is fastened to the leaf spring 83, the latter in turn being flexibly attached to the armature by means of the screws 84 and 85. The stationary core 65 is provided with shading coils 88 and 89 and the armature is provided with a shading coil 76 to prevent chattering. A pair of screws 90 extending outwardly from the back board 42 serve as a back stop to keep the armature 75 from moving too far upwardly under the influence of the spring 78. The stationary core 65 is provided with a winding 110.

Upon the insulating block 48 there is mounted a spring contact 92 provided with a contact tip 93 positioned to cooperate with the contact 60 on rod 59. The pivotal arm 39 is mounted by means of the pivot block 95 which is fastened to the back 42 by means of screws 96. The pivot block 95 is provided with a pivot pin 97 which serves to suspend the swinging arm 39. The arm 39 is provided with a round insulating button 99 which abuts against the back of spring contact 92. Swinging movement of the arm 39 to the left, as shown in Figures 2 and 4, is limited by the head of the adjustable screw 100.

Referring to the wiring diagram Figure 1, there are provided alternating current supply lines $L_1'$ and $L_2$, the former being connected through a disconnect switch 101 and through a fuse 102 to the line $L_1$, which serves with line $L_2$ as the power supply lines of the system. The controls illustrated in Figure 1 are located at an "operator's station" and at an "inspector's station" as indicated by the dotted line enclosures. At the operator's station there is provided push button 105, one terminal of which is connected to $L_1$ and the other terminal of which is connected through line 106 to junction 107. A parallel connected inspector's station push button 108 likewise has one terminal connected to line $L_1$ and the other terminal connected through line 103 to junction 107. From junction 107 line 106 extends to junction 104 and thence through the winding of alternating current relay 109 to line $L_2$. Relay 109 is provided with two pairs of contacts, viz. 109A and 109B, both of which are open when winding 109 is de-energized. From junction 104 line 106 likewise extends to one terminal of winding 110 of the pressure relay 40, the other terminal of the winding being connected to line $L_2$. Pressure relay 40 is provided with one pair of contacts 60 and 93, which are normally closed in the testing operation and which open upon decrease in pressure in the vessel being tested. From line $L_1$ a circuit extends through contacts 109A of relay 109 to junction 111 which is cross connected, through line 112 to junction 113. From junction 111 a circuit extends through line 114 to one terminal of a motor winding 116, the other terminal of the winding being connected to $L_2$.

The motor generally designated 117 serves, through suitable gearing 118 and cam 119 (Figures 7 and 8) to operate a pair of cam-operated switches 120A and 120B which are preferably of the microswitch type. The motor 117 together with its switches 120A and 120B are illustrated in Figures 6, 7 and 8. The motor may conveniently be of the Telechron type, having a winding 116 mounted upon the motor armature core 121 which in turn supports a case 122 containing the revolving armature and gearing terminating in the slowly rotating shaft 123. Upon the shaft 123 there is conveniently mounted a single cam 119 shaped as illustrated in Figure 8, to have a single narrow lobe 126 operating the movable element 124 of the microswitch, generally designated 127.

The microswitch includes one pair of contacts 120A which are open when the operating element 124 of the microswitch is on the cam lobe 126 and a pair of contacts 120B which are closed with the operating element in the same position.

Figures 6, 7 and 8 show the manner in which the timer switch is constructed; Figure 1 illustrates the wiring connections of timer motor 117 and time contacts 120A and 120B; Figure 8 illustrates the position with the timer motor stopped, between tests. As the motor 117 operates and cam 119 rotates, contacts 120B open and contacts 120A close and remain thus closed for the time period required for the cam 119 to make one revolution, whereupon the motor is de-energized. The motor-driven switches 120A and 120B are thus timing switches and establish the testing period for the tank or vessel undergoing pressure testing. The time interval may obviously be varied to suit the requirements of the testing operation. From junction 113 a line 131 extends through indicator lamp 132 at the inspector's station and from junction 113 there also extends a line 133 through a corresponding indicator lamp 134 at the operator's station. The lamps are lighted during the testing period.

One terminal of contact 120A of the motor-driven timing switch is connected to line $L_1$ and the other terminal to junction 104 and switch 120A is accordingly in parallel with the push buttons 105 and 108 at the operator's and inspector's stations. One terminal of the motor-driven timing switch contact 120B is connected to line $L_1$ and the other terminal is connected through line 136 to junction 137 and thence continues through line 136 to junction 138. From junction 138 a circuit extends through line 139 to one terminal of the winding of relay 140, the other terminal of the winding being connected to line L₂. Relay 140 is provided with only one contact 140A which is closed when the winding of relay 140 is de-energized and is open when the winding is energized. Relay 140 is energized through cam switch 120B while the timing motor is idle between tests, and is also energized during the test, except when failure occurs, as hereinafter shown.

From line L₁ a circuit extends through contact 109B and thence through line 141 and through normally closed contacts 140A of relay 140 to junction 142 and thence through line 143, junction 147, to one terminal of the winding of alarm relay 150, the other terminal of this winding being connected through a normally closed inspector's station reset button 160 to line L₂. Alarm relay 150 is provided with two pairs of contacts, the first pair being 150A which are open when the winding of relay 150 is de-energized. One contact 150A is connected to L₁, the other being connected through line 151 to junction 142. The second pair of contacts of the alarm relay 150 are illustrated at 150B, this pair of contacts being closed when the winding of alarm relay 150 is de-energized. One of the contacts 150B is connected to line L₁, the other terminal being connected to the terminal 93 of the pressure relay 40 and thence through contact 60 of the pressure relay to junction 138. A condenser 145 and resistor 146 are connected in parallel around contacts 60 and 93 of relay 40 to minimize sparking.

Junction 147 on line 143 is connected to work circuit 148 which serves as a feeder for the circuit 149 of buzzer 152, circuit 153 of lamp alarm 154 and circuit 155 of the lamp alarm 156. The buzzer alarm 152 and lamp alarm 154 are at the inspector's station and lamp alarm 156 is at the operator's station. All three alarms 152, 154 and 156 are connected in parallel and are operated simultaneously. If desired, the work ejection device 156′ or other work element for ejecting or marking the defective part or performing any desired work function, may be incorporated as shown and energized in parallel by line 155′.

*Operation*

In utilizing the apparatus, the box or tank undergoing testing is connected through union 12 to the air pressure supply line 14 and valve 15 is opened so as to establish pressure in the vessel undergoing testing. At this time valve 22 is open. After the pressure in the vessel undergoing testing has built up to line pressure on line 14, as indicated by gauge 20, valve 15 is closed and the operator pushes button 105 for a short period to initiate the testing cycle. The pressure established in the vessel 10 undergoing testing serves to flex the diaphragm 30 which pushes against the cup 34 and thus forces stem 33 against the action of spring 36, if used, thus tending to swing arm 39 in a counter-clockwise direction with the result that contact 93 is moved against rod contact 60. The permissible movement of contact 93 is relatively large to accommodate varying pressure on diaphragm 30, and as a consequence of the pressure exerted by the diaphragm 30, rod 33 is moved, thus swinging arm 39, and moving contacts 93 and 60 as a unit to the right, as shown in Figures 2 and 4, against the pressure of springs 36 and 52 until the pressure of springs 36 and 52 balances the pressure exerted by the diaphragm. The position of contact 93 and contact 60, moving as a unit, is thus adjusted automatically in accordance with the applied pressure, and there is initially established a datum position for contact 60.

The closure of a circuit through operator's station button 105 serves to establish a circuit from line L₁, through button 105, line 106, to junction 107, line 106, to junction 104. As a result the windings of relay 109 and winding 110 of the pressure relay 40 are both energized. The energization of the winding 110 of pressure relay 40 serves to pull the armature 75 downwardly into contact with the stationary core 65, against the action of spring 78. In going downward, rod 82 is brought into contact with the horizontal rod 59. It will be noted, of course, that rod 82 is flexibly mounted with respect to armature 75, by means of spring 83 and hence armature 75 is free to go solidly into contact with the stationary core 65 without exerting excessive pressure upon the locking rod 82 which is nevertheless held firmly in engagement with contact rod 59, locking the latter against lateral movement once the winding 110 of the pressure relay 40 is energized. Thus, when the operator pushes the button 105, this locks contacts 60 and 93 in the position established by the pressure applied to the vessel 10 undergoing testing.

The closure of contact 109A of relay 109 establishes a circuit from line L₁ to junction 111 and from junction 111 through line 112, to junction 113 and thence through lines 131 and 133 to the visual signals 132 and 134 at the inspector's station and operator's station respectively. These signals indicate the test is under way. From junction 111 the circuit extends through line 114, to winding 116 of the timing motor 117. The timing motor thus starts and quickly opens contact 120B and closes contact 120A, the latter establishing a circuit in parallel with the push button 105, thus maintaining the circuit from line L₁ to junction 104 and hence maintains the energization of relay winding 109 and energization of the winding 110 of pressure relay 40.

When the timing motor 117 is in the normal stopping position its contacts 120B serve to maintain relay 140 energized and hence during the period that re-connection of vessels undergoing testing is made no alarm can be given. Contact 120B is also used for the purpose of by-passing contacts 60 and 93 during the time at which the inspection is started. Pressure relay 40 is very sensitive and may sometimes operate due to extraneous vibration; thus the slight jarring caused by the various relays as they operate is sometimes sufficient to bounce the contacts 60 and 93, causing the alarm to sound immediately giving a faulty inspection. Hence contacts 120B by-pass contacts 60 and 93 of pressure relay 40 until the test starts. As the motor 117 begins to operate at the beginning of the test cycle, contact 120B is opened, but this does not serve to de-energize relay 140 because the pressure relay 40, contacts 60 and 93, have in the meantime been closed, and contacts 150B of alarm relay 150 are likewise closed due to the fact that the alarm relay 150 is normally not energized until failure occurs. Hence, so long as the pressure relay contacts 60 and 93 remain closed, thus indicating a satisfactory maintenance of pressure in the vessel undergoing testing, relay 140 likewise remains energized and its pair of contacts 140A remain open.

The energization of relay 109 at the beginning of the testing cycle served to close contacts 109B (in addition to the closure of contacts 109A), but the closure of contacts 109B merely sets up but does not close a circuit extending from line L₁, through contacts 109B, line 141, contacts 140A (which are then open due to the energization of the winding of relay 140), thence to junction 142, line 143, to one terminal of the winding of alarm relay 150, thence through reset push button 160 to line L₂. Likewise, due to the fact that alarm relay 150 remains de-energized when pressure is maintained satisfactorily during the test, its contacts 150A remain open.

In the event there is a leak in vessel 10, the pressure drop in the vessel permits the rubber diaphragm 30 to retract and hence moves rod 33 and swinging arm 39 to the left, as illustrated in Figures 2 and 4. After a very small drop in pressure, contact 93 separates from contact 60 (pressure relay 40) and this serves to de-energize the winding of relay 140. The latter consequently moves to the de-energized position and closes its contacts 140A, thus closing the circuit already prepared by closure of contacts 109B to the winding of alarm relay 150. The alarm relay 150 is accordingly energized, opening its contacts 150B and establishes a self-holding circuit from line L₁, through contacts 150A and line 151 to junction 142 and thence as previously described. Contact 150B insures the interruption of the circuit of relay 140 once that circuit has been opened via relay 40. This gives better performance because the contacts 93 and 60 of pressure relay 40 are very sensitive and are separated at first by a very small distance. Any mechanical jar or other vibration would cause contacts 60—93 to spark were it not for the function of relay 140. In this way detrimental chattering and resultant unstable performance are prevented. Due to the application of potential of line L₁ through contact 150A to junction 142 and line 143, energy is likewise supplied to the work circuit 148 and to buzzer alarm 152 and lamp alarm 154 at the inspector's station and to the lamp alarm 156 at the operator's station. These alarms and any work operations that may be accomplished by element 156' remain in operation and can only be de-energized by opening of the circuit of alarm relay 150 at reset button 160 located at the inspector's station. The responsibility for discarding any vessels 10 which do not meet the pressure test thus rests solely upon the inspector since no further testing can proceed without his authorization and his operation of the reset push button 160. Division of responsibility is accordingly minimized.

The operation of timing motor 117 continues regardless of opening of the pressure relay contacts 60 and 93 until cam 119 reaches a position such that lobe 126 moves contact 120A to the open position and 120B to the closed position. The opening of contacts 120A serves to de-energize relay 109 and the closure of contact 120B establishes a circuit from line L₁ to junction 138, thus energizing relay 140. The de-energization of relay 109 serves to open contacts 109A, thus stopping the operation of the timing motor 117 and likewise opens contact 109B. It will thus be observed that the circuit extending from line L₁ through contacts 109B and line 141 and contacts 140A is open at contact 109B, but the alarm relay 150 nevertheless remains energized through its self-holding circuit via contacts 150A, which remain closed until the alarm relay 150 is de-energized.

Before the apparatus is in condition for further test, the reset button 160 at the inspector's station must be pressed, thus de-energizing relay 150 so as to re-establish the initial conditions, previously described.

Many variations may be made in the apparatus illustrated, described and claimed without departing from the spirit of the invention. Thus, by varying the responsive devices at 25, the apparatus undergoing test may be subjected to any desired potential, fluid pressure or otherwise, wherein a potential is established, and a decrease in potential utilized for giving the alarm. These and other variations are deemed to be within the purview of the invention claimed.

What we claim is:

1. An apparatus for testing vessels for tightness to fluids under pressure comprising a pressure responsive device equipped to be attached to the vessel undergoing testing, said device including a pressure responsive contact movable through a range of positions in response to the pressure applied thereto, a cooperating follower contact maintained in engagement with the pressure responsive contact throughout said movement, said pressure responsive contact being movable in a direction away from said follower contact in response to a decrease in pressure, a first operator control, means responsive to said first operator control for locking said follower contact, work means set into action in response to an opening of said contacts, and second operator control means located at another station having exclusive control of said work means for halting the operation thereof after the operation has been initiated.

2. A testing system comprising a pressure responsive switch which is normally closed upon pressure being applied thereto and having means capable of locking a member of said switch such that a subsequent decrease in pressure will cause the opening of said switch, work means under control of said switch capable of being set in operation when said switch opens, operator controlled timing means for connecting said pressure responsive switch and work means in operative condition for a predetermined time period beginning when said pressure responsive switch has been locked by pressure applied thereto, and second operator controlled interrupting means for halting the operation of said work means in the event it is actuated during said time period.

3. The apparatus of claim 2 further characterized in that the operator controlled timing means includes a push button and an initiating circuit controlled thereby for initiating operation of said timing means and a holding circuit controlled by said timing means for maintaining operation thereof for a predetermined period.

4. The apparatus of claim 2 further characterized in that said timing means includes means for precluding effective operation of said work means for a short period at the beginning of each testing cycle.

5. A system for testing vessels for leaks under applied pressure, including a pressure responsive switch which is movable to closed position due to application of testing pressure and which is capable of adjustment under influence of said pressure throughout a range of pressure positions, operator controlled means for locking said switch in any position in which it has been moved responsive to said testing pressure, means responsive to a subsequent opening of the contacts due to a change in pressure for maintaining the circuit of said contacts open and initiating energization of a work circuit.

6. The system of claim 5 further characterized in that it includes a cyclic time switch, the cyclic operation of which is initiated by said operator controlled means and means operated by said cyclic time switch for preparing said work circuit controlled by said pressure responsive switch.

7. The system of claim 5 further characterized in that the energization of said work circuit actuates work means capable of maintaining said initiating circuit open.

8. In a system for testing vessels for leaks under sustained pressure, including means for applying a charge of fluid under pressure to a vessel undergoing test, a pressure responsive switch having a pressure element connectable to said vessel and a pressure operated contact movable into a closed position against a movable contact for establishing a normally closed control circuit, the improvement comprising, means including an operator controlled switch at a first station for locking said movable contact in any position to which it is moved by the pressure operated contact, relay means connected to and operated in response to closure of said operator controlled switch at said first station; and cyclic timing means responsive to said relay means for opening a shunt circuit around said pressure responsive normally closed switch contacts in said normally closed control circuit, means responsive to the de-energization of said normally closed control circuit due to the opening of said normally closed pressure responsive contacts when said shunt circuit is open for initiating energization of a work circuit.

9. The apparatus of claim 8 further characterized in that means is provided operable coincidental with initiation of energization of said work circuit for maintaining open at another place said normally closed circuit control circuit which is de-energized when said pressure responsive contacts have opened.

10. The apparatus of claim 8 further characterized in that means is provided which is operable coincidental with energization of said work circuit for maintaining said work circuit energized.

11. The apparatus of claim 8 further characterized in that said cyclic timing means includes means for maintaining said normally closed control circuit in closed condition at the beginning and end of said cycles of timing.

12. The apparatus of claim 8 further characterized in that second operator controlled means is provided at another station for de-energizing said work circuit.

HARRY WILLIAM HOFFMAN.
GROVER H. HELMER.

REFERENCES CITED

The following references are of record in the file of this patent:

UNITED STATES PATENTS

| Number | Name | Date |
| --- | --- | --- |
| 1,429,949 | Jacobs | Sept. 26, 1922 |
| 1,850,208 | Jones | Mar. 22, 1932 |
| 1,884,942 | Widell | Oct. 25, 1932 |
| 2,226,325 | Sandford | Dec. 24, 1940 |
| 2,232,711 | Maher | Feb. 25, 1941 |
| 2,268,124 | Maybarduk | Dec. 30, 1941 |